United States Patent
Rozumek et al.

(12) 
(10) Patent No.: US 6,695,905 B2
(45) Date of Patent: Feb. 24, 2004

(54) PIGMENTS HAVING A VIEWING ANGLE DEPENDENT SHIFT OF COLOR, METHOD FOR PRODUCING SAID PIGMENTS, USE OF SAID PIGMENTS IN SECURITY APPLICATIONS, COATING COMPOSITION COMPRISING SAID PIGMENTS AND A DETECTING DEVICE

(75) Inventors: Olivier Rozumek, St. Martin (CH); Edgar Müller, Fribourg (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 10/182,734

(22) PCT Filed: Feb. 14, 2001

(86) PCT No.: PCT/EP01/01644

§ 371 (c)(1),
(2), (4) Date: Aug. 14, 2002

(87) PCT Pub. No.: WO01/60924

PCT Pub. Date: Aug. 23, 2001

(65) Prior Publication Data

US 2003/0015123 A1 Jan. 23, 2003

(30) Foreign Application Priority Data

Feb. 16, 2000 (EP) .............................................. 00103177

(51) Int. Cl.⁷ .......................... C09G 1/00; C09K 17/00; C09D 11/00
(52) U.S. Cl. ................. 106/415; 428/690; 252/301.16; 252/301.4 R; 252/301.36; 252/301.35
(58) Field of Search ........................ 106/415; 428/690; 252/301.36, 301.35, 301.16, 301.4 R, 301.4 H

(56) References Cited

U.S. PATENT DOCUMENTS

| | | |
|---|---|---|
| 3,711,176 A | 1/1973 | Alfrey, Jr. et al. |
| 3,874,890 A | 4/1975 | Bernhard et al. |
| 3,926,659 A | 12/1975 | Bernhard et al. |
| 4,086,100 A | 4/1978 | Esselborn et al. |
| 4,323,554 A | 4/1982 | Bernhard |
| 4,565,581 A | 1/1986 | Bernhard |
| 4,705,300 A | 11/1987 | Berning et al. |
| 4,705,356 A | 11/1987 | Berning et al. |
| 4,721,217 A | 1/1988 | Phillips et al. |
| 4,744,832 A | 5/1988 | Franz et al. |
| 4,779,898 A | 10/1988 | Berning et al. |
| 4,867,793 A | 9/1989 | Franz et al. |
| 4,930,866 A | 6/1990 | Berning et al. |
| 5,084,351 A | 1/1992 | Philips et al. |
| 5,302,199 A | 4/1994 | Prengel et al. |
| 5,350,448 A | 9/1994 | Dietz et al. |
| 5,693,134 A | 12/1997 | Stephens |
| 6,572,784 B1 * | 6/2003 | Coombs et al. ........ 252/301.16 |

FOREIGN PATENT DOCUMENTS

| | | |
|---|---|---|
| EP | 927749 | 7/1999 |
| WO | WO 00/12634 | 3/2000 |
| WO | WO 02/40599 | * 5/2002 |

OTHER PUBLICATIONS p. 598, Grant & Hackh's Chemical Dictionary, 5$^{th}$ ed.* p. 1164, Hawley's Condensed Chemical Dictionary, 12$^{th}$ ed.*

* cited by examiner

Primary Examiner—C. Melissa Koslow
(74) Attorney, Agent, or Firm—Shoemaker and Mattare

(57) ABSTRACT

The invention describes luminescent optically variable pigments (OVP), methods for obtaining such pigments, as well as the use of such pigments as security elements in inks, coatings and articles. The luminescence centers are preferably incorporated into the dielectric material of the OVP's optical *Fabry-Perot* resonance cavity, allowing for the machine-discrimination of luminescent OVP from simple mixtures of luminescents and non-luminescent OVP.

28 Claims, No Drawings

PIGMENTS HAVING A VIEWING ANGLE DEPENDENT SHIFT OF COLOR, METHOD FOR PRODUCING SAID PIGMENTS, USE OF SAID PIGMENTS IN SECURITY APPLICATIONS, COATING COMPOSITION COMPRISING SAID PIGMENTS AND A DETECTING DEVICE

The present invention relates to pigments having a viewing angle dependent shift of color, method for producing said pigments, use of said pigments in security applications, coating composition and bulk materials comprising said pigments and a detecting device for excitation and reading said pigments.

Pigments having a viewing angle dependent shift of color, the so called optically variable pigments, have made their proof as an efficient, printable anti-copy device on bank notes and security documents since 1987. Today, a large part of the world-wide printed currency relies on optically variable copy protection devices, and among these latter, optically variable ink (OVI™) has acquired a preeminent place.

The viewing-angle dependent shift of color cannot be reproduced by color copying equipment. Various different types of OVP materials are commercially available today, all depend on interference thin film structures. The hue, the color travel and the chromaticity of the structures however depend upon on the material constituting the layers, the sequence and the number of layers, the layer thickness as well as on the production process.

Very brilliant colors are obtained with a first type of OVP, made by physical vapor deposition according to e.g. U.S. Pat. Nos. 4,705,300; 4,705,356; 4,721,217; 4,779,898; 4,930,866; 5,084,351 and related. This OVP is constructed as a thin-film vapor-deposited Fabry-Perot resonator stack. Simple-sandwich metal-dielectric-metal, as well as double-sandwich metal-dielectric-metal-dielectric-metal layer sequences are described. The middle metal layer can be realized as opaque totally reflecting layer to yield a maximum in reflectivity of the incident light. The top metal layer(s) must be partially transparent, such that light can be coupled in and out of the Fabry-Perot resonator.

Incident light falling upon an optically variable pigment flake of said metal-dielectric-metal type is partially reflected at the top metal layer. Another part of the light travels through the dielectric and is reflected at the bottom metal layer. Both reflected parts of the incident light finally recombine and interfere with each other. Constructive or destructive interference results, depending on the thickness of the dielectric layer and on the wavelength of the incident light. In the case of white incident light, some of the light components, having determined wavelengths, are reflected, whereas other components, having other wavelengths, are not reflected. This gives rise to a spectral selection, and hence to the appearance of color.

The path difference between the top-reflected and the bottom-reflected part of the light depends noteworthy on the angle of incidence, and so does the resulting interference color.

Another, second type of OVP, made according to EP 708,154; DE 195,25,503; U.S. Pat. Nos. 5,624,468, 5,401,306; 4,978,394; 4,344,987 and related, is based on coated aluminum flakes. Mechanically flattened aluminum particles are coated by chemical vapor deposition (CVD) or by wet chemical methods with a dielectric layer and a subsequent metal or second dielectric layer. Interference colors result by the same effect as described above.

This type of OVP is cheaper in manufacture than the first type, but it also exhibits less brilliant colors and less angle-dependent color shift than the first type.

Still another, third type of OVP is based on liquid crystal pigments. Such pigments are, for example, made according to EP 601,483; EP 686,674 and related, is based on polymerized cholesteric liquid crystal (LC) phases. Cholesteric LC phases exhibit a helical arrangement of molecules, resulting in a periodic variation of the material's index of refraction along the direction perpendicular to the surface. This, in turn, has a similar effect on light scattering/light transmission as a Fabry-Perot interference stack. Due to the helical arrangement of the cholesteric LC phases, light of one circular polarization is reflected in preference, whereas the other circular polarization component is transmitted in preference and must be absorbed by a dark background. This type of OVP shows less bright colors than metal-reflector based OVP. Its color shifting properties are excellent, however, due to the rather low index of refraction of the organic material.

A fourth type of OVP, based on coated mica flakes, is described in U.S. Pat. Nos. 3,874,890; 3,926,659; 4,086,100; 4,323,554; 4,565,581; 4,744,832; 4,867,793; 5,302,199; 5,350,448; 5,693,134 and related. A high-refractive material, e.g. $TiO_2$, applied by wet chemical methods or by CVD, is used for the coating and acts as a partially reflecting surface on both sides of the mica flake. The mica has the role of the dielectric. Only faint colors and weak color shifting properties are obtained with this type of OVP, which is also known as "iridescent pigment".

A fifth type of OVP is an all-polymer multi-layer light reflector/transmitter foil according to U.S. Pat. No. 3,711,176 (cf. W. J. Schrenk et al. "Critical Reviews of Optical Science and Technology", CR39, 1997, p 35–49). This foil, too, is an interference device which exhibits angle-dependent spectral reflection and transmission properties, and could be used for the manufacturing of a fifth type of optically variable pigment.

Large amounts of optically variable pigment are produced for merely decorative purposes (automotive paints, lacquers and the like), and are thus available to the common public in the form of paints and sprays. The security potential of optically variable ink features on bank notes is considerably decreased if no distinction can be made between "security OVP" and "decorative OVP". A counterfeiter could noteworthy reproduce bank notes on a color copier and add the missing optically variable features with the help of commercially available decorative paints or sprays.

It is an object of the present invention to overcome the drawbacks of the prior art.

In particular it is an object to provide any kind of optically variable pigments (OVP) which comprise—apart from the viewing angle dependent color shift—additional features resulting in an response upon external energy.

It is a further object to make "security OVP" materially different from "decorative OVP" while retaining good color shifting properties.

A further object consists in providing "security OVP" with means for an easy and reliable distinction in particular from "decorative OVP".

It is a further object to provide OVP which can be authenticated with the help of a simple device, as well as machine-authenticated at low and at high speed.

It is a further object to provide methods for manufacturing "security OVP", in particular by using the same equipment and process as are used for the production of decorative OVP without significantly increasing the production cost.

These objects are solved by the features of the independent claims.

Particularly the objects are solved by pigments comprising an interference structure of at least two thin film layers of different materials said pigments having a viewing angle dependent shift of color and at least one of said layers comprises at least one luminescent material.

In a first embodiment the OVP has a structure comprising at least one light-transmitting dielectric layer with a first and a second surface essentially parallel to each other and at least one semi-transparent, partially reflecting layer arranged on each of said first and second surfaces of the dielectric layer with the luminescent material being comprised in at least one of the dielectric layers.

In a second embodiment the OVP has a structure comprising an opaque totally reflecting layer having first and second surfaces essentially parallel to each other and at least one sequence arranged on at least one of said first and second surfaces of the opaque totally reflecting layer, said sequence comprises at least one dielectric layer and at least one semi-transparent partially reflecting layer with the dielectric layer of said sequence being adjacent to the totally reflecting layer and the luminescent material being comprised in at least one of the dielectric layers.

The partially reflecting and partially transmitting top layer has a thickness in the range of 5 to 25 nm. Preferably the semi-transparent partially reflecting layer is chosen from metal, metal-oxides or metal-sulfides such as aluminium, chromium, $MOS_2$, $Fe_2O_3$.

The dielectric layer is of a low refractive index material having an index of refraction not exceeding 1.50, under the precondition that the material does not comprise luminescent material. Preferably the material is chosen from $MgF_2$, $SiO_2$, $AlF_3$. Low refractive index dielectrics result in a high angle-dependent color shift. The thickness of the dielectric depends on the desired OVP color; it is of the order of 200 to 600 nm. Gold-to-green OVP e.g. has a $MgF_2$ layer of 440 nm, green-to-blue OVP one of 385 nm thickness.

The opaque totally reflecting layer is selected from metals or metal alloys such as aluminum, silver, copper, cobalt-nickel alloy, aluminum alloys.

Most preferred is aluminum with a reflectivity of nearly 99% over the whole spectral domain of interest. The totally reflecting layer has a thickness in the range of 50 to 150 nm.

Pigments of the latter type can have a symmetric $Cr/MgF_2/Al/MgF_2/Cr$ structure, in order to yield equal reflecting properties for both sides. The central aluminum layer acts as a total reflector. In the context of the present invention it is sufficient to consider the half of the OVP structure, i.e. the basic $Cr/MgF_2/Al$ stack.

In the context of the present invention the terms "partially reflecting", "semi-transparent", "opaque", "totally reflecting", "dielectric", "hue", "color", "chromaticity", etc. relate o those parts of the electromagnetic spectrum perceptible for a human being.

The terms and expressions used throughout this application are defined according to Römpp Chemie Lexikon, ed. J. Falbe, M. Regitz, 9. edition, Georg Thieme, Stuttgart New York, 1992.

These pigments consist of flakes, which are of the order of 20 to 30 $\mu$m large, and about 1 $\mu$m thick.

In still another embodiment of the invention, the luminescent ions are incorporated into a dielectric coating applied to an aluminum flakes, to yield OVP of the above mentioned second type. Said dielectric coating can again be applied either by chemical vapor deposition, e.g. using a fluidized-bed reactor, or, alternatively, by wet chemical methods, as described in the prior art.

The color-shifting properties of these types of OVP are noteworthy related to the realizable path difference, within the dielectric, between orthogonal incidence and grazing incidence. The incident beam is diffracted according to Snell's law, $n_1*\sin(\alpha)=n_2*\sin(\beta)$, where $n_1$ and $n_2$ are the respective refraction indices of the materials 1 and 2, and $\alpha$ and $\beta$ are the respective beam angles to the normal. Assuming $n_1=1$ (air), the grazing angle incidence ($\alpha=90°$) condition is described as $\sin(\beta)=1/n_2$. The maximum length of the light path L within the dielectric, in terms of the dielectric thickness d, is then given by $L=d/\sqrt{(1-1/n_2^2)}$. The following table illustrates this relationship at the example of a few representative materials (P=packing density, indicated where available):

|         | $n_2$ | $(L/d)_{max}$ | P    |
|---------|-------|---------------|------|
| $AlF_3$ | 1.23  | 1.72          | 0.64 |
| $MgF_2$ | 1.38  | 1.45          | 0.72 |
| $CaF_2$ | 1.23  | 1.72          | 0.57 |
| $CaF_2$ | 1.46  | 1.37          | 1.0  |
| $SiO_2$ | 1.45  | 1.38          | 0.9  |
| $LaF_3$ | 1.55  | 1.31          | 0.8  |
| $CeF_3$ | 1.63  | 1.27          | 0.8  |
| $PbF_2$ | 1.75  | 1.22          |      |
| $Si_3N_4$ | 2.00 | 1.15         |      |
| $TiO_2$ | 2.20  | 1.12          |      |

The dielectric layer of the OVP flake can comprise at least one luminescent ion. Especially interesting for the purpose of the present invention are the trivalent ions of certain transition elements such as chromium ($Cr^{3+}$), iron ($Fe^{3+}$), etc. Particularily preferred are rare-earth ions, Preferably the rare earths ions are selected from the group consisting of yttrium ($Y^{3+}$), praseodymium ($Pr^{3+}$), neodymium ($Nd^{3+}$), samarium ($Sm^{3+}$), europium ($Eu^{3+}$), terbium ($Tb^{3+}$), dysprosium ($Dy^{3+}$), holmium ($Ho^{3+}$), erbium ($Er^{3+}$), thulium ($Tm^{3+}$) and ytterbium ($Yb^{3+}$).

Such doping is not easily practicable with $MgF_2$ as the dielectric, because of the relatively small ionic radius of the $Mg^{2+}$ ion (72 pm), compared to the radii of the trivalent rare-earth ions (86–102 pm), and of the simultaneous need for charge compensation. Although the co-evaporation of $MgF_2$ with trivalent rare earth fluorides yields chemically doped materials, the narrow $MgF_2$ host lattice can not accommodate for the strain induced by the voluminous doping ions, which tend in consequence to form clusters apart. Clustered excited rare-earth ions undergo rapid non-radiative deactivation, and no luminescence is observed.

The dielectric layer containing said luminescent material is selected from the group consisting of difluorides of the second main group or zinc or cadmium, or of mixtures thereof. In a preferred embodiment $CaF_2$ is used as dielectric material to be doped with trivalent rare-earths, in particular lanthanoides, due to the comparable ionic radii of $Ca^{2+}$ (100 pm) and of the $Ln^{3+}$ ions. The positive excess charge of the $Ln^{3+}$ dopant must be compensated, however. Charge compensation can be brought about either anionically, by replacing a fluoride ion ($F^-$, 133 pm) by an oxide ion ($O^{2-}$, 140 pm), or cationically, by replacing a calcium ion ($Ca^{2+}$, 100 pm) by a sodium ion ($Na^+$, 102 pm). Anionic compensation is easily achieved by annealing the material in oxygen, but is not practicable in the presence of an heat-sensitive carrier web. Cationic compensation requires a carefully controlled, simultaneous co-doping with equal amount of $Ln^{3+}$ and $Na^+$ ions during the sputtering process.

Dielectric materials, also allowing for an easy incorporation of the luminescent material in particular the trivalent rare-earth ions however without charge compensation, are selected from the group consisting of trifluorides of rare earths, trifluorides of bismuth, or mixtures thereof, complex fluorides of trivalent rare earth ions or bismuth and monovalent alkaline ions or divalent alkaline-earth or transition ions, in particular zink and mixtures thereof. Particularly preferred are trifluorides of yttrium and in particular the non-luminescent ions, i.e. $YF_3$, $LaF_3$, $CeF_3$, $GdF_3$, $LuF_3$, and $BiF_3$ or, alternatively, among their complex fluorides, e.g. $ALnF_4$, $AeLn_2F_8$, $ALn_3F_{10}$, etc., wherein A is a monovalent alkaline ion, preferably selected among $Li^+$, $Na^+$, $K^+$; Ae is a divalent alkaline-earth or transition ion, preferably selected among $Mg^{2+}$, $Ca^{2+}$, $Sr^{2+}$, $Ba^{2+}$, $Zn^{2+}$; and Ln is a trivalent rare-earth ion, preferably selected among $Y^{3+}$, $La^{3+}$, $Ce^{3+}$, $Gd^{3+}$, or $Bi^{3+}$. In the context of the present invention, the pure trifluorides or mixtures thereof are preferable over said complex fluorides, because the evaporation characteristics of the former can be better controlled.

For the incorporation of luminescent material in particular of the trivalent transition element ions, dielectric materials are selected from the group consisting of trifluorides of elements of the third main group or bismuth or of trivalent transition element ions or mixtures thereof, complex fluorides of elements of the third main group or bismuth and an alkaline ion, an alkaline-earth ion or zinc or mixtures thereof. Particularily adapted are $EF_3$ materials, wherein E is $Al^{3+}$, $Ga^{3+}$, $In^{3+}$, $Bi^{3+}$ or a trivalent transition element ion or $Na_3AlF_6$.

Fluoride materials are the preferred dielectric hosts for said luminescent ions. Fluorides have noteworthy a low-energy optical phonon spectrum, i.e. their IR absorption bands are situated at low energy. Under such circumstances, the vibrational deactivation of the embedded excited luminescent ions is strongly inhibited, resulting in a high luminescence yield and in long-lived excited states. Fluorides are furthermore a rather uncommon host matrix in commercially available luminescents. This adds favorably to the security potential of the present invention. The luminescent ions incorporated in the OVP can in this way be distinguished, e.g. by their specific luminescence decay times, from simple mixtures of commercial luminescents and non-security optically variable ink.

In any case, OVP having luminescence centers incorporated within the Fabry-Perot resonance cavity can be distinguished from simple mixtures of non-luminescent OVP and added luminescent material by their angle-dependent excitation spectrum. The OVP's resonance cavity is internally amplifying the incident light intensity for wavelengths corresponding to the minima of the cavity's reflection characteristics, i.e. for $n*d=k*\lambda/2$, the laser resonator condition. At these wavelengths, the cavity preferably takes up energy from the environment, and the light intensity inside the cavity reaches a multiple of the outside intensity. A luminescent material situated within the cavity will thus get more strongly excited at the cavity's resonance condition than out of this condition. Because the cavity's resonance wavelength is angle-dependent, the luminescence intensities obtained for different incidence angles of the same exciting radiation will be different, which makes it possible to determine that the luminescent is located within the OVP's cavity rather than outside of it.

The deposition of the luminescent dielectric layer can be performed by the same method as used for the deposition of the $MgF_2$ layer. $MgF_2$ can be deposited from a hot semi-melt by electron beam sputtering. Rare-earth fluorides are more or less comparable in melting point and evaporation characteristics with $MgF_2$, and can therefore be deposited by the very same technique. The doping elements can be added in beforehand to the matrix fluoride; e.g. 2% of $EuF_3$ can be pre-melted with 98% of $LaF_3$ to form a homogeneous mixture, and this mixture can be used as a depositing material. The following table gives an overview of melting and boiling points of some typical dielectric materials, useful in the context of the present invention:

|  | mp | bp |
|---|---|---|
| NaF | 993° C. | 1695° C. |
| $MgF_2$ | 1261° C. | 2239° C. |
| $CaF_2$ | 1423° C. | 2500° C. |
| $AlF_3$ | 1291° C. | sublimes |
| $YF_3$ | 1152° C. | 2675° C. |
| $LaF_3$ | 1504° C. | 2359° C. |
| $CeF_3$ | 1432° C. | 2161° C. |
| $GdF_3$ | 1229° C. | 2427° C. |
| $LuF_3$ | 1182° C. | 2309° C. |

The physical and chemical properties, i.e. the preferred charge, the ionic radii and the chemical affinities, of the ions of yttrium and the lanthanides are equal or very similar, such that in mixed trifluorides, all of said metal ions evaporate at practically the same rate under electron beam sputtering conditions. This is a favorable condition for the sputtering of mixed or doped materials. Lanthanum trifluoride is a particularly preferred host material in the context of the present invention, because all other rare-earth trifluorides form extensive solid solutions with $LaF_3$, such that there is no ion clustering upon crystallization, and concentration quenching at low active ion concentrations can be largely avoided.

More than one active luminescent ion can be incorporated into the same dielectric host matrix, in order to realize a complex coding. A security system can be realized based on such a coding, using a set of different host matrices and a set of different luminescent ions, incorporated into said host matrices. Customer-specific luminescence-coded optically variable pigments can be obtained in this way.

The total amount of replaced host matrix ions by luminescent doping ions is typically of the order of 0.1 to 10%. A too high concentration of doping ions leads to self-quenching of the luminescence, whereas a too low concentration is difficult to detect and not suited for a high-speed reading application.

In a further embodiment said luminescent material is an organic or a metal-organic compound.

In a further embodiment the dielectric layer consists of two or more sub-layers and the luminescent material is comprised in at least one of the sub-layers. The sub-layers are dielectric layers by themselves. The sub-layer which contains the luminescent material is designated hereinafter as the first sub-layer. The first sub-layer is adjacent to at least one of the first or second surfaces of the opaque totally reflecting layer and at least the second sub-layer is of a material having a refractive index of equal or less than 1.50, in particular $MgF_2$ and $AlF_3$.

The $MgF_2$ dielectric of conventional OVP of said first type can be substituted entirely or in part by one of the doped dielectric materials e.g. yttrium/lanthanide fluoride. If e.g. the entire $MgF_2$ layer is replaced by $LnF_3$ (Ln=Y, La . . . Lu), a higher index of refraction results, with a concomitantly decreased angle-dependent color shift. Preferably, according to the invention, only part of the dielectric layer is replaced by $LnF_3$, in order to save the OVP's color shifting properties. Preferably, the doped $LnF_3$ is applied as an inner layer on top of the central aluminum reflector. Particularly favorable conditions for retaining the OVP's color-shifting properties are obtained if the thickness of the luminescent-doped layer is chosen to be less than 10% of the total thickness of the dielectric.

Although the color shifting properties of the OVP are not influenced by the sequence of the $MgF_2$ and $LnF_3$ layers (in both cases, the longest possible optical path within the dielectric layer is given by $L=(L_1+L_2)=(d_1/\sqrt{(1-1/n_1^2)})+(d_2/\sqrt{(1-1/n_2^2)})$; where $d_1$ and $d_2$ indicate the thickness of the respective layers, and $n_1$ and $n_2$ their respective indices of refraction), the arrangement having the doped $LnF_3$ layer close to the aluminum reflector allows to isolate it with a $MgF_2$ layer from the terminal chromium overcoat. Chromium is noteworthy a known quencher of certain luminescence centers.

To compensate for an eventually decrease in angle-dependent color-shift caused by the presence of the $LnF_3$ layer, the $MgF_2$ part of the dielectric can be replaced, according to the invention, by an $AlF_3$ layer. $AlF_3$ has a lower index of refraction (n=1.23) than $MgF_2$ (n=1.38), and can thus easily compensate for the introduction of an equivalent layer of $LaF_3$ (n=1.55).

In another embodiment of the invention the OVP-structure comprises at least one light-transmitting dielectric layer with a first and a second surface and at least one semi-transparent partially reflecting layer of a high refractive index material, having an index of refraction of at least 2.00 arranged on at least one of the first and second surface of the dielectric material, wherein the luminescent material being comprised in the high refractive index material. In particular the luminescent ions are incorporated into a high-refractive inorganic coating of mica flakes, to yield OVP of the above mentioned fourth type. Said inorganic coating can either be applied by chemical vapor deposition, e.g. using a fluidized-bed reactor, or, alternatively, by wet chemical methods, as described in the prior art. In this embodiment, the luminescence centers are not located within the OVP's optical resonant cavity, and no angle-dependent excitation characteristic is observed in consequence.

In a further embodiment the OVP structure comprises an opaque totally reflecting layer, preferably an aluminum flake, with a first and a second surface and at least one semi-transparent partially reflecting layer of a high refractive index material, having an index of refraction of at least 2.00 arranged on at least one of the first and second surface of the dielectric material, wherein the luminescent material being comprised in the high refractive index material.

Preferred high refractive index materials are made of $Fe_2O_3$ or $TiO_2$.

The invention is by no means restricted to OVP of the inorganic type. In a further embodiment, the dielectric layer is of an organic or a metal-organic polymer.

The manufacturing of all-polymer color shifting film and glitter pigments is principally described in WO 99/36478. This optically variable device is based on a stack of alternating high- and low-refractive index polymer layers. For example an alternating 209-layer stack of Poly-ethylene-2, 6-naphthalate (PEN) and Poly-methyl-methacrylate (PMMA) is produced by coextrusion, to yield an optically variable polymer foil which is shifting blue-to-red in transmission, and yellow-to-cyan in reflection when going from normal to oblique incidence. Other polymers, such as Poly-ethylene-terephthalate (PET), Poly-butylene-terepthalate (PBT), etc. can be used to manufacture such polymer stacks, which can also comprise more than two different types of polymers.

A wide variety of organic and metal-organic luminescents can be incorporated into plastic materials by diffusion or by dissolution in the molten state. In particular, Poly-methyl-methacrylate (PMMA) has been proven as a suitable matrix for certain highly light resistant fluorescent materials. In a preferred embodiment of the invention perylene derivatives, such as N,N'-bis(2,6-bis-diisopropyl)-phenyl-perylenetetracarboxylic acid diimide (="perylimide"), incorporated into PMMA, can be advantageously used for the manufacturing of fluorescent response; the fluorescent dye having excellent long-term stability.

Such luminescent "perylimide"-doped PMMA is used, together with PEN, in place of the undoped PMMA of example 1 of WO 99,36,478, for the manufacturing of a multilayer optically variable foil, which has additional fluorescent properties (perylimide: last absorption maximum at 520 nm; emission maximum at 555 nm). The so obtained optically variable foil is subsequently comminuted to a glitter pigment. Such luminescent optically variable foil or pigment can be discriminated by its angular dependence of the luminescence excitation and emission spectra from luminescents which are merely present outside the optically variable stack.

The optically variable polymer stack can, according to WO 99/36478, noteworthy be designed as an optical filter, having well-defined angular-dependent filtering characteristics. In an implementation of this kind, the luminescence is chosen such that it is only excitable and observable at well-defined incidence angles.

The luminescent dye may be present either in at least one of the layers of the polymer-multilayer stack, or in at least one of the polymer components, or even in all of its components or layers. Other types of luminescents than "perylimide", and other types of polymers can be used, of course, as understood by the skilled in the art.

Such polymers can be rolled out to very thin foils, of the order of 5 µm thickness. Multiple foils can be extruded together ("co-extrusion"), such that the diameter of an individual foil component takes a thickness of the order of 200 to 600 nm, useful for optic interference effects organic or metal-organic luminescent materials can either be added to the polymer prior to foil manufacturing, or, alternatively, be printed onto a foil component prior to co-extrusion. The printing process can also be used to confer a specific pattern (indicia) to the luminescent feature. Luminescent dyes printed on the surface will migrate into the polymer under the influence of heat during the later stages of treatment. After co-extrusion, the obtained multi-layer plastic foil can be comminuted to a pigment, preferably using cryogenic conditions.

The luminescent materials should preferably be soluble in, or miscible with the polymer substrate, in order to avoid opacifying of the latter by the presence of a second phase having a different index of refraction. Molecular or polymeric luminescent materials are suitable for the purpose of the invention. Colloidal luminescent materials of organic, metal-organic or inorganic nature are useful as well, under the condition that their particle size does not exceed 50 nm.

In still another embodiment the luminescent OVP structure is based on polymerized cholesteric liquid crystal (LC) phases. The luminescent can be part of the molecule crystal phase. i.e. kovalently bonded to the cholesteric liquid crystal or it can be incorporated in the form of a host-guest complex in the liquid crystal phase and be bonded by van-der Waals forces.

In a further embodiment of the present invention the OVP exhibit electroluminescence.

In a preferred embodiment the structure comprises an opaque totally reflecting layer having first and second surfaces essentially parallel to each other and at least one sequence arranged on at least one of said first and second surfaces of the opaque totally reflecting layer, said sequence comprises at least one electrically conducting layer of a high work function, at least one dielectric layer and at least one semi-transparent partially reflecting layer with the electrically conducting layer of the high work function of said sequence being adjacent to the totally reflecting layer and the luminescent material being comprised in at least one of the dielectric layers.

Electroluminescence devices, in particular organic electroluminescence devices (Organic Light Emitting Diodes, OLEDS) are known in the art and described, e.g. in U.S. Pat. Nos. 3,995,299; 4,164,431; 4,539,507; 4,720,432; 4,769,292; 5,736,754; 5,759,709; 5,817,431 and numerous other patent publications.

An OLED device, according to the art, is a thin-film stack comprising at least three different layers: a first electrically conducting layer characterized by a first, higher electric work function, such as indium tin oxide (ITO); followed by a dielectric layer characterized by light-emitting capability, such as poly-paraphenylvinylidene (PPV); followed by a second electrically conducting layer characterized by a second, lower electric work function, such as magnesium-silver alloy. If an electric potential is applied to the device, such that the positive pole of the power source is connected to the first conducting layer having the higher electric work function, and the negative pole of the power source to the second conducting layer having the lower electric work function, hole and electron charge carriers are simultaneously injected into said dielectric layer through said first and said second conducting layer, respectively. Said hole and electron charge carriers eventually recombine within said dielectric layer creating molecular excited states and corresponding emission of light (electroluminescence).

More sophisticated OLED devices, according to the art, comprise two dielectric layers, a first one of a hole- (p-) conducting polymer, such as polyvinylcarbazole, and a second one of an electron- (n-) conducting polymer, such as polythiophene, said dielectric layers being sandwiched between said two conducting layers, such that the p-conducting polymer faces the electrically conducting layer having the higher electric work function, and the n-conducting polymer faces the-electrically conducting layer having the lower electric work function. In this case, one of the two polymer layers must also be the light emitter.

In other devices, the polymers of the dielectric layer do not participate in light emission, but, instead, a thin layer of a high-efficiency light-emitting dye, such as a porphyrinic compound, is inserted between the p- and the n-conducting polymer layers, to perform the light emitting function.

In still other devices, molecular compounds, such as triarylamines or naphtaphenylene benzidine (NPB), respectively oligo (hexa)-thiophenes or aluminum hydroxyquinoline (Alq), are used as the p- and the n-conducting materials.

According to the existing art, OLED's are made for lighting or display purposes and laid out such as to yield a maximum amount of emitted light. For these reasons, the dielectric layer, as well as at least one of said electrically conducting layers are made to be optically as transparent as possible.

According to the present invention, the organic light emitting device is laid out such as to simultaneously show optical variability and light emission if excited by a current. For obtaining optical variability, the dielectric layer, or the combined dielectric layers, is (are) chosen to have an overall thickness of between about 200 nm and 800 nm. The back electrode of the device is a total reflecting layer, and the front electrode of the device is a partially reflecting/partially transmitting layer, such as to form, together with the dielectric layer, a Fabry-Perot cavity, as known from other optically variable devices disclosed in the prior art. Preferably, the partially reflecting/partially transmitting layer has a reflection coefficient close to 0.38, which will result in about equal intensities of the front-reflected ray and the transmitted, back-reflected and transmitted ray.

The totally reflecting electrode can be an aluminum layer, coated with a thin layer of indium-tin-oxide (ITO), as the high-work-function (hole-injecting) electrode. The partially reflecting/partially transmitting electrode can be a thin (3 to 4 nm) chromium layer, playing the role of the low-work-function (electron-injecting) electrode. The dielectric can be made of poly-paraphenylvinylidene (PPV), as the light-emitting material. The skilled in the art can easily derive other suitable material combinations from the existing disclosures on OLED technology According to the invention, the same multilayer stack combines thus the functions of an electroluminescent (OLED) device and of an optically variable device (OVD). This is achieved through the combination of a dielectric layer or multilayer with light-emitting properties, said dielectric layer or multilayer having an appropriate thickness to enable for optical interference effects between first and second surfaces, with first and second, at least partially reflecting, electrodes disposed on said first and second surfaces, respectively, of said dielectric layer or multilayer, whereby said first and second electrodes have hole- and electron-carrier injection properties, respectively.

Combining the present disclosure with the state-of-the-art disclosures on OLED technology, the skilled in the art can realize numerous alternative embodiments of an OLED-optically variable device (OLED-OVD). He may also opt to use an inorganic, light-emitting dielectric, as described in the earlier disclosures on electroluminescent devices. Or he may opt to use combinations of organic and inorganic materials for making the dielectric, light-emitting layer.

The OLED-OVD according to the invention can be used as such, in the form of an optically variable, light emitting foil. This foil can be applied to currency, documents, articles and the like, by methods such as hot- or cold-stamping or the like, as a security element. Electric connections to the electrodes can be provided, in order to probe the light-emitting capability of the applied security foil.

Alternatively, the OLED-OVD according to the invention can be ground to pigment flakes and used in a printing ink or coating composition, for printing indicia on security documents or articles, or for coating articles. In this case, an electron-emitting testing equipment can be provided for exciting the electroluminescent OVP flakes in the printed ink or coating composition, in order to authenticate the security feature.

Said luminescence-coded optically variable pigment can be authenticated at a first, elementary level by the naked eye, through observation of its angle-dependent color shift. At a more advanced level, e.g. at vending points, simple supplementary means such as a UV-lamp or a small photoelectric luminescence detecting device can be employed for an enhanced authenticity check. A 50 to 100 times magnifier with long-wave UV illumination can also be used to check for the luminescence of the individual pigment flakes. Finally, at the level of the central banks, a quantitative characterization of the color shifting properties, as well as a quantitative assessment of the OVP luminescence in terms of emission wavelengths, intensity and decay time can be performed. The luminescent OVP according to the present invention is furthermore well suited for the high speed detection on currency processing machines.

EXAMPLES

The invention is further illustrated by the following examples:

1. Gold-To-Green OVP with Green Luminescence

A sodium-compensated $CaF_2$:Tb,Na phosphor was prepared by melting together a mixture of calcium fluoride (92 parts by weight), terbium fluoride (6.7 parts by weight) and sodium fluoride (1.3 parts by weight) at 1500° C.

A 5 layer sequence was deposited by PVD on a carrier as follows:
Chromium metal, 4 nm thick
$CaF_2$:Tb,Na (2.5% $TbF_3$ in $CaF_2$), 480 nm thick
Aluminum metal, 40 nm thick
$CaF_2$:Tb,Na (2.5% $TbF_3$ in $CaF_2$), 480 nm thick
Chromium metal, 4 nm thick Optical path at orthogonal incidence: 600 nm (n=1.25). The terbium luminescence is activated by long wave UV.

2. Gold-To-Green OVP with Red Luminescence

A 7 layer sequence was deposited by PVD on a carrier as follows:
Chromium metal, 4 nm thick
$MgF_2$, 208 nm thick
$LaF_3$:Eu (1% $EuF_3$ in $LaF_3$), 205 nm thick
Aluminum metal, 40 nm thick
$LaF_3$:Eu (1% $EuF_3$ in $LaF_3$), 205 nm thick
$MgF_2$, 208 nm thick
Chromium metal, 4 nm thick Total optical path at orthogonal incidence: 605 nm. The europium luminescence is activated by long wave UV.

3. Color-Shift Compensated Gold-To-Green OVP with IR Luminescence

A 7 layer sequence was deposited by PVD on a carrier as follows:
Chromium metal, 4 nm thick
$AlF_3$, 240 nm thick
$LaF_3$:Nd (3% $NdF_3$ in $LaF_3$), 200 nm thick
Aluminum metal, 40 nm thick
$LaF_3$:Nd (3% $NdF_3$ in $LaF_3$), 200 nm thick
$AlF_3$, 240 nm thick
Chromium metal, 4 nm thick Total optical path at orthogonal incidence: 605 nm. The neodymium luminescence is activated by long wave UV, or, alternatively, at selected Nd absorption wavelengths in the visible or in the near infrared.

4. Color-Shift Compensated Gold-To-Green OVP with IR Luminescence

A 7 layer sequence was deposited by PVD on a carrier as follows:
Chromium metal, 4 nm thick
$MgF_2$, 395 nm thick
$LaF_3$:Yb (5% $YbF_3$ in $LaF_3$), 40 nm thick
Aluminum metal, 40 nm thick
$LaF_3$:Yb (5% $YbF_3$ in $LaF_3$), 40 nm thick
$MgF_2$, 395 nm thick
Chromium metal, 4 nm thick Total optical path at orthogonal incidence: 607 nm. The ytterbium luminescence is activated by 950 nm IR radiation and observed in the spectral range of 980–1000 nm.

5. Luminescence-Coded Green-To-Blue OVP

A 7 layer sequence was deposited by PVD on a carrier as follows:
Chromium metal, 5 nm thick
$MgF_2$, 200 nm thick
$LaF_3$:Pr,Tb,Tm (1% $PrF_3$+0.5% $TbF_3$+0.5% $TmF_3$ in $LaF_3$), 166 nm thick
Aluminum metal, 40 nm thick
$LaF_3$:Pr,Tb,Tm (1% $PrF_3$+0.5% $TbF_3$+0.5% $TmF_3$ in $LaF_3$), 166 nm thick
$MgF_2$, 200 nm thick
Chromium metal, 5 nm thick Total optical path at orthogonal incidence: 535 nm. The luminescence is activated by long wave UV.

6. Up-Converting Luminescent Optically Variable Mica Pigment

Luminescent oxide, vanadate, or oxysulfide films can be prepared on glass substrates by chemical vapor deposition (CVD) using the method and apparatus according to U.S. Pat. No. 3,894,164. This method can be adapted to the coating of particles in a fluidized-bed reactor: Commercial, not coated mica pigment was suspended in a fluidized-bed reactor heated to a temperature of 480–500° C. A stream of argon carrier gas was passed at a rate of about 400 ml/minute through an evaporation furnace heated to about 220° C., containing an intimate mixture of 92 mole percent of yttrium 2,2,6,6-tetramethyl-3,5-heptanedionate, 3 mole percent of erbium 2,2,6,6-tetramethyl-3,5-heptanedionate, and 5 mole percent of ytterbium 2,2,6,6-tetramethyl-3,5-heptanedionate, and introduced as a first reactant gas into the fluidized-bed reactor. A mixture of argon gas (500 ml/minute) and hydrogen sulfide gas (200 ml/minute) was introduced as the second reactant gas into said fluidized-bed reactor. After the deposition of a conveniently thick layer of $Y_2O_2S$:Er,Yb up-converting luminescent on the surface of the mica flakes, the first reactant gas stream was cut and the pigment was annealed at 800° C.

The high-refractive-index luminescent coating is acting as the mirror component of this OVP, on both sides of the mica dielectric. This type of luminescent OVP shows no angle-dependent excitation characteristics.

7. Luminescent Optically Variable Aluminum Flake Pigment

Luminescent films on glass substrates can be produced by wet chemical "sol-gel" methods, according to U.S. Pat. No. 4,965,091. An adaptation of this method can be used for the coating of particles.

One part by weight of commercial, untreated aluminum flake pigment (i.e. having an neat oxide surface) was suspended in 5 parts of isopropanol. After the addition of 1 part of tetraethoxysilane and 0.1 parts of a 10% solution of terbium nitrate in water, 1 part of 5% aqueous ammonia solution was added. The mixture was progressively heated under stirring to 80° C. during 8 hours, cooled down and filtered. The coated pigment was dried and annealed at 450° C., after which it exhibited a green terbium luminescence under long-wave UV excitation.

A second, metallic molybdenum coating was applied onto the luminescent coating according the methods of the prior art, in order to create the Fabry-Perot optical cavity, and hence the OVP color shifting effect.

8. Luminescent Optically Variable Organic Pigment

"Organic" luminescent OVP was prepared as follows:

The luminescent dye was N,N'-Bis(2,5-di-tert-butylphenyl)-3-4-9-10-perylenedicarboximide, a dye known from solar concentrators.

The foil material was poly-ethylene-terephthalate (PET), having an index of refraction n=1.57. Preformed clear PET foils of 5 µm thickness and of 20 µm thickness were used as the starting materials.

5 µm PET foil was coated with N,N'-Bis(2,5-di-tert-butylphenyl)-3-4-9-10-perylenedicarboximide by drawing it throught a 0.1% solution of the luminescent dye in isopropanol. The so coated and dried foil was subject to vacuum-coating with aluminum, 40 nm on one side, and 140 nm on the opposite side (multiple passes required).

A 5-layer composite foil was then assembled, comprising:
a cover layer of clear 20 µm PET foil a first layer of died and aluminized 5 μm PET foil, with the 140 nm aluminum coating oriented towards the center of the assembly a middle layer of clear 20 μm PET foil a second layer of died and aluminized 5 μm PET foil with the 140 nm aluminum coating oriented towards the center of the assembly a cover layer of clear 20 μm PET foil This assembly, having an overall thickness of 70 μm, was subsequently rolled out (co-extruded), using a roll temperature between 100 and 120° C., to a new total thickness of 5 μm. The total length of the foil was hereby multiplied by a factor of 14, and the respective thickness of the individual components was reduced by a factor of 14. The resulting multi-layer foil had the following structure:

PET (1.45 μm)
Aluminum (3 nm)
PET with luminescent (350 nm)
Aluminum (10 nm)
PET (1.45 μm)
Aluminum (10 nm)
PET with luminescent (350 nm)
Aluminum (3 nm)
PET (1.45 μm)

The total optical path between the outer and the inner aluminum layer, i.e. the optical length of the Fabry-Perot resonator, amounts in this case to n*d=550 nm, yielding a green-to-blue color shifting OVP.

The intermediate and the cover PET layers are principally needed to augment the overall thickness of the primary stack, in order to permit the co-extrusion to the required size. It would also be possible in this case to incorporate the luminescent into the cover layers, instead of into the Fabry-Perot dielectric layers. The advantages of an "in cavity" luminescent feature, in particular the possibility of machine detection of such a feature with respect to a simple mixture of conventional OVP and luminescent, are strongly in favor of an "in cavity" marking.

9. Electroluminescent Optically Variable Pigment

Electroluminescent OVP was prepared as follows:

On a water-soluble-release-coated PET carrier foil, the following layer sequence was evaporated:

1. Chromium (3.5 nm) (electron injecting layer)
2. Oligo-paraphenylvinylidene (350 nm)
3. Indium-tin-oxide (5 nm) (hole injecting layer)
4. Aluminum (40 nm) (counter-electrode)
5. Indium-tin-oxide (5 nm) (hole injecting layer)
6. Oligo-paraphenylvinylidene (350 nm)
7. Chromium (3.5 nm) (electron injecting layer)

The chromium, indium-tin-oxide and aluminum layers were evaporated by electron-beam technique; the oligo-paraphenylvinylidene layers were thermally evaporated.

The oligo-paraphenylvinylidene was obtained as the self-coupling product of 1,4-dimethoxy-2,5-bis-chloromethyl-benzene through reaction with potassium-tert-butoxylate in tetrahydrofurane, to yield a product of mean molecular weight of the order of 1000.

The layer so produced was detached from the carrier with water and ground to a pigment. The OVP so produced had a green-to-blue color shift and showed a yellow-green luminescence when subject to a negative corona discharge.

What is claimed is:

1. A pigment comprising an interference structure having at least two thin film layers of different materials, said pigment having a viewing angle dependent shift of color, wherein the interference structure has a light-transmitting dielectric layer which comprises at least one luminescent material.

2. A pigment according to claim 1, wherein the interference structure comprises at least one light-transmitting dielectric layer having first and second surfaces essentially parallel to each other and at least one semi-transparent, partially reflecting layer arranged on each of said first and second surfaces of the dielectric layer with the luminescent material being present in at least one of the dielectric layers.

3. A pigment according to claim 1, wherein the interference structure comprises an opaque totally reflecting layer having first and second surfaces essentially parallel to each other and at least one sequence arranged on at least one of said first and second surfaces of the opaque totally reflecting layer, said sequence comprising at least one dielectric layer and at least one semitransparent partially reflecting layer with the dielectric layer of said sequence being adjacent to the totally reflecting layer and the luminescent material being present in at least one of the dielectric layers.

4. A pigment according to claim 3, wherein at least one of the dielectric layers comprises at least a first and a second sub-layer, these being dielectric layers themselves, wherein the luminescent material is present in at least one of the sub-layers.

5. A pigment according to claim 4, wherein the first sub-layer is adjacent to at least one of the first or second surfaces of the opaque totally reflecting layer and contains the luminescent material, and the second sub-layer is of a material having a refractive index equal or less than 1.50.

6. A pigment according to claim 5, wherein the second sub-layer is of $MgF_2$ or $AlF_3$.

7. A pigment according to claim 1, wherein the interference structure comprises an opaque totally reflecting layer having first and second surfaces essentially parallel to each other and at least one sequence arranged on at least one of said first and second surfaces of the opaque totally reflecting layer, said sequence comprising at least one electrically conducting layer of a high work-function, at least one dielectric layer and at least one semitransparent partially reflecting layer with the electrically conducting layer being adjacent to the totally reflecting layer and an electroluminescent material being present in at least one of the dielectric layers.

8. A pigment according to claim 1, wherein the interference structure comprises at least one light-transmitting dielectric layer with a first and a second surface and at least one semi-transparent partially reflecting layer of a high refractive index material, having and index of refraction of at least 2.00, arranged on at least one of the first and second surface of the dielectric material, wherein the luminescent material is present in the high refractive index material.

9. A pigment according to claim 1, wherein the interference structure comprises at least one opaque, totally reflecting layer having a first and a second surface and at least one semi-transparent partially reflecting layer of a high refractive index material, having and index of refraction of at least 2.00, arranged on one of the first and second surfaces of the dielectric material, wherein the luminescent material is present in the high refractive index material.

10. A pigment according to claim 1, wherein at least one of the dielectric layers is of a dielectric material selected from the group of materials consisting of the tri-fluorides of the rare-earth elements, of bismuth, and of mixtures thereof, as well as the complex fluorides containing trivalent ions of the rare-earth elements, of bismuth, or of mixtures thereof, and monovalent or divalent ions of the alkali, alkaline-earth, or transition-metal elements including zinc, or of mixtures thereof, and contains a luminescent material selected from the group of luminescent ions.

11. A pigment according to claim 10, wherein the rare-earth elements are selected from the group consisting of yttrium and the elements of the lanthanide series.

12. A pigment according to claim 1, wherein at least one of the dielectric layers is of a dielectric material selected from the group of materials consisting of the tri-fluorides of elements of the third main group of the periodic table or bismuth, the trivalent transition elements, the mixtures thereof, as well as the complex fluorides containing elements of the third main group of the periodic table or bismuth, and monovalent or divalent alkali or alkaline earth or zinc ions, or mixtures thereof.

13. A pigment according to claim 1, wherein at least one of the dielectric layers containing said luminescent material is selected from the group consisting of the difluorides of the second main group of the periodic table, zinc, cadmium, and mixtures thereof.

14. A pigment according to claim 1, wherein the dielectric layer containing said luminescent material is selected from the group of organic or metal-organic compounds.

15. A pigment according to claim 1, wherein said luminescent material is a transition element ion.

16. A pigment according to claim 1, wherein said luminescent material is a rare-earth element ion.

17. A pigment according to claim 1, wherein said luminescent material is an organic or a metal-organic compound.

18. A pigment according to claim 1, wherein the dielectric layer is of an organic or a metal-organic polymer.

19. A pigment according to claim 18, wherein the said luminescent material is selected from the group consisting of organic compounds, and metal-organic compounds.

20. A method for producing a pigment according to claim 7, comprising the step of depositing at least one of the dielectric layers containing the luminescent material by a physical vapor deposition method.

21. A method according to claim 20, wherein the physical vapor deposition method is selected from the group consisting of sputtering, magnetron sputtering, thermal evaporation, and electron-beam assisted evaporation.

22. A method for producing a pigment according to claim 7, comprising the step of depositing at least one of the dielectric layers containing the luminescent material by a chemical vapor deposition method.

23. A method according to claim 22, wherein the chemical vapor deposition method is selected from the group consisting of thermal reaction deposition, reactive sputtering, and fluidized bed coating.

24. A method for producing a pigment according to claim 7, comprising the step of depositing at least one of the dielectric layers containing the luminescent material by a wet chemical method.

25. A method according to claim 24, wherein the wet chemical method is selected from the group consisting of controlled hydrolyses of precursor materials in solution.

26. A method for producing a pigment according to claim 7, comprising the step of producing at least one of the dielectric layers containing said luminescent material by extrusion or co-extrusion.

27. A printing ink comprising a pigment according to claim 7.

28. A security document comprising a layer of printing ink according to claim 27.

* * * * *